N. M. LA PORTE.
PROCESS FOR MAKING CLOSURES.
APPLICATION FILED AUG. 2, 1913.

1,149,200.

Patented Aug. 10, 1915.

UNITED STATES PATENT OFFICE.

NORBERT M. LA PORTE, OF BALTIMORE, MARYLAND, ASSIGNOR TO THE CROWN CORK AND SEAL COMPANY OF BALTIMORE CITY, OF BALTIMORE, MARYLAND, A CORPORATION OF MARYLAND.

PROCESS FOR MAKING CLOSURES.

1,149,200.  Specification of Letters Patent.  Patented Aug. 10, 1915.

Application filed August 2, 1913. Serial No. 782,572.

*To all whom it may concern:*

Be it known that I, NORBERT M. LA PORTE, a citizen of the United States, residing at Baltimore city and State of Maryland, have invented certain new and useful Improvements in Processes for Making Closures, fully described and represented in the following specification and the accompanying drawings, forming a part of the same.

This invention relates to an improvement in processes for making closures for bottles and the like, and particularly to a process of making closures of that type heretofore known as crown corks.

Closures of the type to which this invention generally relates have usually comprised a metallic shell, a sealing disk, and an intermediate sticking material which is rendered adhesive by heat and set by cooling, as, for instance, a mixture of rosin, copal and paraffin. Usually disks punched from paper impregnated with this adhesive are interposed between the shells and their sealing disks, a sufficient degree of heat being employed in the process of manufacture to soften the sticking material so that it would properly adhere to the shell and the sealing disk. After heating, according to the best practice, the assembled parts of the crown are cooled under a pressure which was maintained until the sticking material had set. As the crowns required time to cool, the speed of production was correspondingly limited.

Closures of the type to which the invention relates are made by automatic machinery in very large quantities and are widely used for bottling liquids which vary widely in their characteristics. Under some circumstances, the liquids bottled or sealed under the closure are liable to work through or around the sealing disk and come in contact with the adhesive. While this is not serious in a large percentage of cases, in some instances, some liquids, particularly beverages, are injuriously affected either in appearance or taste by the adhesive. It has not, however, been possible to select adhesives for particular liquids, as the conditions of manufacture govern the adhesive employed irrespective of the particular use to which the closure is to be put, and the adhesives used or suggested for securing the sealing disk of a closure of the type referred to to its metal shell have injuriously affected some of the liquids or beverages sealed under the closure.

A closure of the type to which this invention is applicable is shown in the accompanying drawings, in which—

Figure 1:
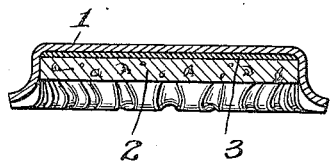
Figure 2:
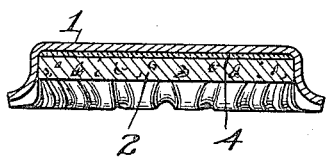

Figure 1 is a sectional view of a closure, in which the sealing disk is secured to the shell by a layer of fibrous material carrying the sticking material; and Fig. 2 is a similar view of a modification, in which the sealing disk is secured to the shell by a disk of sticking material.

The object of the present invention is to provide a process for the manufacture of closures of the type mentioned which will enable them to be made more rapidly than has heretofore been the case, while at the same time producing a closure having important advantages over those heretofore produced.

With this object in view, the process embodying the invention, broadly considered, comprises interposing between the shell and the sealing disk a cementing layer comprising a sticking material which, although normally non-adhesive, is capable of being rendered adhesive and thereafter of being set or hardened when heated to a proper temperature. Said cementing layer also comprises a substance which when heated to a temperature below that at which the sticking material sets or hardens will render said sticking material adhesive. A cementing layer of this kind may be handled while in a non-adhesive condition and when in place it is only necessary to subject it to heat in order to first render the cementing layer adhesive and then to set or harden it. A cementing layer having the properties above mentioned may be produced by the juxtaposition or mixture of a sticking material comprising an albuminous substance with a substance capable of giving off moisture when subjected to heat, such for instance as crystalline magnesium chlorid.

The albuminous material has great advantages for use in the manner described, because it will set or harden by coagulation at a temperature below the boiling point of water and notwithstanding the presence of moisture or water. When, therefore, such an albuminous material is interposed between the shell and sealing disk of a closure, it is not necessary to evaporate any water which may be associated with the albuminous material in its adhesive condition in order to obtain a perfect setting or hardening of such albuminous material. This property of albumen to set or coagulate without regard to the presence of moisture or water and below the boiling point of water is of great importance in the manufacture of crown corks because the cementing layer is so inclosed between the shell and the sealing disk as to provide little or no opportunity for the escape of the moisture from the cementing layer. Any attempt, therefore, to drive off moisture by heating to a temperature above the boiling point of water may result in the creation of a vapor pressure between the sealing disk and shell, which would separate the two and render the closures defective. A further advantage of the setting of the albumen at a low temperature is that it is not necessary to heat the shells to a relatively high temperature in order to unite the sealing disks and shells and therefore there is no danger of injury to the decorated shells now widely employed.

Magnesium chlorid is advantageous for use in the manner above specified, because it contains a relatively high percentage of water, as water of crystallization, and will release or evolve such water at a temperature below that at which the albuminous substance coagulates. Therefore, a relatively small proportion of crystalline magnesium chlorid may be used with the albuminous sticking material, which leads to economy in production.

In the best embodiment of the invention, a suitable carrier is provided for the sticking material and moisture cooling substance, this carrier consisting advantageously of a fibrous material, particularly paper. When thin paper is used, it may be impregnated by immersing it in a solution of albuminous material and the reacting substance, such as crystalline magnesium chlorid, and thereafter dried. Disks punched from such paper may then be interposed between the shell and sealing disk and subjected to the requisite amount of heat in order to produce the desired union of the shell and sealing disk, pressure being applied to the closure during the heating operation where this is requisite in order to bring all the parts into close contact. In the best embodiment of my invention, the carrier of fibrous material, usually paper, is properly charged with a suitable filler and advantageously a filler which is fusible or capable of softening at a temperature at or below that at which albuminous material will coagulate.

Such a filler properly applied prevents waste of the sticking material, which may be applied to the filler-charged carrier as a surface coating on each side thereof. If a paraffin is the filler employed, the carrier, such as paper, may be passed through a bath of the melted paraffin so rapidly that the paraffin cannot thoroughly impregnate the paper, the paper charged with paraffin being then passed between scrapers to remove any excess. This paraffin-charged carrier may be passed through a solution of albuminous material and magnesium chlorid and then dried. I have found that a solution containing about 5% of albumen and 8% of magnesium chlorid is suitable for the purpose intended. A disk punched from a cementing layer comprising such a paraffin-charged carrier coated with the albuminous material and the crystalline magnesium chlorid may be interposed between the shell and sealing disk and the assembled closure subjected to pressure and heat, whereupon the moisture evolved from the crystalline magnesium chlorid will moisten the albuminous material and render the same adhesive, and then the albuminous material, as soon as the cementing layer has reached a somewhat higher temperature, will be coagulated so as to set or harden and firmly unite the shell and sealing disk.

In practice, the heating of the cementing layer is usually accomplished by applying heat to the shell, this heat being transmitted through the shell to the cementing layer. The latter need not be raised much above the temperature necessary to coagulate the albumen, say about 160° F. While this may necessitate a somewhat higher temperature for the outside of the shell, it need not be sufficient to injure and decorations thereon.

It has been found in practice that when a carrier, such as paper, is properly charged with a filler such as paraffin, and the sticking material then applied, a good adhesion is obtained between the shell and carrier, and the sealing disk and the carrier. This seems to be due to the fact that the paraffin recedes from the surface of the fibrous material, so that the sticking material attaches itself to the fibrous material of the carrier, thus producing a firm union between the shell and the sealing disk. Hence, with a carrier having its surface charged with a proper filler and its interior porous, the advantage is obtained that the sticking material is applied to a smooth non-absorbent carrier surface and hence waste of sticking material is avoided, while on the other hand, when the closure is completed, the sticking material adheres to the surface of the fibrous material so that it may properly combine therewith. Another highly important advantage of the albuminous material is that it is insoluble in potable liquids when set, so that it cannot in any way affect the taste of beverages in receptacles sealed by a closure made in the manner described.

A closure made in accordance with the above described embodiment of the invention is illustrated in Fig. 1, in which 1 indicates the metal shell, 2 the cork disk, and 3 the intermediate cementing layer, in this case comprising a disk of fibrous material, such as paper coated with the sticking material.

While I have particularly mentioned a crystalline magnesium chlorid as a reacting substance to be used in conjunction with a sticking material capable of being set by heat, it is to be understood that there are other materials which may be employed in place thereof.

Instead of using a fibrous carrier with a surface coating of the sticking material and reacting substance as hereinbefore described, I may prepare a plastic composition comprising a filler, such as clay, gypsum, infusorial earth, or other similar oxid, and a solution of the albuminous material and crystalline substance; and from this plastic mass may form the desired disks, as for example by first rolling the plastic mass into sheets or strips and then drying the same and punching the disks therefrom. These disks may then be used in the same manner as the disks of cementing material hereinbefore described. A closure made in accordance with this form of the invention is illustrated in Fig. 2, wherein 1 is the metal shell, 2 the sealing disk of cork or the like, and 4 the layer of sticking material.

I claim—

1. In the art of making closures comprising a shell and a sealing disk, the process which consists in interposing between the shell and the sealing disk a cementing layer comprising a sticking material capable of being set by the action of heat, and a substance capable of evolving under the action of heat, a solvent of said sticking material, and then subjecting said cementing layer to heat, whereby the sticking material is rendered adhesive and set.

2. In the art of making closures comprising a shell and a sealing disk, the process which consists in interposing between the shell and the sealing disk a cementing layer comprising a sticking material capable of being set by the action of heat, and a substance capable of evolving, under the action of heat, a solvent of said sticking material, submitting the closure to pressure, and then subjecting said cementing layer to heat, whereby the sticking material is rendered adhesive and set.

3. In the art of making closures comprising a shell and a sealing disk, the process which consists in interposing between the shell and the sealing disk a cementing layer comprising a sticking material capable of being rendered adhesive by moisture and of being set by heat, said cementing layer also comprising a substance capable of evolving moisture under the action of a heat less than that necessary to set the sticking material, and then subjecting the said cementing layer to heat to evolve said moisture and to set the sticking material.

4. In the art of making closures comprising a shell and a sealing disk, the process which consists in interposing between the shell and the sealing disk a cementing layer comprising a sticking material capable of being rendered adhesive by moisture and of being set by heat, said cementing layer also comprising a substance capable of evolving moisture under the action of a heat less than that necessary to set the sticking material, submitting the closure to pressure, and then subjecting the said cementing layer to heat to evolve said moisture and to set the sticking material.

5. In the art of making closures comprising a shell and a sealing disk, the process which consists in interposing between the shell and the sealing disk a cementing layer comprising a sticking material capable of being rendered adhesive by moisture and of being set by heat, and also comprising a crystalline substance capable of giving off its water of crystallization at a temperature less than that necessary to set the sticking material, and then subjecting the cementing layer to heat, whereby the sticking material is rendered adhesive and then set.

6. In the art of making closures comprising a shell and a sealing disk, the process which consists in interposing between the shell and the sealing disk a cementing layer comprising a sticking material capable of being rendered adhesive by moisture and of being set by heat, and also comprising a crystalline substance capable of giving off its water of crystallization at a temperature less than that necessary to set the sticking material, submitting the closure to pressure, and then subjecting the cementing layer to heat, whereby the sticking material is rendered adhesive and set.

7. In the art of making closures comprising a shell and a sealing disk, the process which consists in interposing between the shell and the sealing disk a cementing layer comprising a moisture-soluble albuminous material, and a substance capable of evolving moisture when heated to a temperature less than that required to coagulate the albuminous material, and then raising the temperature of the cementing layer, whereby first the moisture is evolved and the albuminous substance rendered adhesive, and then the said albuminous substance is coagulated.

8. In the art of making closures comprising a shell and a sealing disk, the process which consists in interposing between the shell and the sealing disk a cementing layer comprising a moisture-soluble albuminous material, and a substance capable of evolving moisture when heated to a temperature less than that required to coagulate the albuminous material, submitting the closure to pressure, and then raising the temperature of the cementing layer, whereby first the moisture is evolved and the albuminous substance rendered adhesive, and then the said albuminous substance is coagulated.

9. In the art of making closures comprising a shell and a sealing disk, the process which consists in interposing between the shell and the sealing disk a cementing layer comprising a moisture-soluble albuminous material and a crystalline substance which will give off water at a temperature less than that necessary to coagulate the albumen, and then subjecting the cementing layer to heat, whereby it is rendered adhesive and then set.

10. In the art of making closures comprising a shell and a sealing disk, the process which consists in interposing between the shell and the sealing disk a cementing layer comprising a moisture-soluble albuminous material and a crystalline substance which will give off water at a temperature less than that necessary to coagulate the albumen, subjecting the closure to pressure, and then subjecting the cementing layer to heat, whereby it is first rendered adhesive and then set.

11. In the art of making closures comprising a shell and a sealing disk, the process which consists in interposing between the shell and the sealing disk a cementing layer comprising a soluble-albuminous material and crystalline magnesium chlorid, and then progressively increasing the temperature of the cementing layer, whereby the latter is first rendered adhesive and then set.

12. In the art of making closures comprising a shell and a sealing disk, the process which consists in interposing between the shell and the sealing disk a cementing layer comprising a soluble-albuminous material and crystalline magnesium chlorid, submitting the closure to pressure, and then progressively increasing the temperature of the cementing layer, whereby the latter is first rendered adhesive and then set.

13. In the art of making closures comprising a shell and a sealing disk, the process which consists in interposing between the shell and the sealing disk a cementing layer comprising a carrier of fibrous material coated with a sticking material capable of being rendered adhesive by moisture and of being set by heat in combination with a crystalline substance capable of giving off its water of crystallization at a temperature less than that necessary to set the sticking material, and then subjecting the cementing layer to heat, whereby it is rendered adhesive and then set.

14. In the art of making closures comprising a shell and a sealing disk, the process which consists in interposing between the shell and the sealing disk a cementing layer comprising a carrier of fibrous material coated with a sticking material capable of being rendered adhesive by moisture and of being set by heat in combination with a crystalline substance capable of giving off its water of crystallization at a temperature less than that necessary to set the sticking material, submitting the closure to pressure, and then subjecting the cementing layer to heat, whereby it is rendered adhesive and then set.

15. In the art of making closures comprising a shell and a sealing disk, the process which consists in interposing between the shell and the sealing disk a cementing layer comprising a carrier of fibrous material coated with a soluble albuminous material and a crystalline substance which will give off water at a temperature less than that necessary to coagulate the albumen, and then subjecting the cementing layer to a temperature sufficient to drive off the water from the crystalline substance and to set the albuminous material.

16. In the art of making closures comprising a shell and a sealing disk, the process which consists in interposing between the shell and the sealing disk a cementing layer comprising a carrier of fibrous material coated with a soluble albuminous material and a crystalline substance which will give off water at a temperature less than that necessary to coagulate the albumen, submitting the closure to pressure, and then subjecting the cementing layer first to a temperature sufficient to drive off the water from the crystalline substance to set the albuminous material.

17. In the art of making closures comprising a shell and a sealing disk, the process which consists in interposing between the shell and the sealing disk a cementing layer comprising a carrier of paper coated with a soluble albuminous material and a crystalline substance which will give off water at a temperature less than that necessary to coagulate the albumen, and then subjecting the cementing layer to a temperature sufficient to drive off the water from the crystalline substance and to set the albuminous material.

18. In the art of making closures comprising a shell and a sealing disk, the process which consists in interposing between the shell and the sealing disk a cementing layer comprising a carrier of paper coated with a soluble albuminous material and a crystalline substance which will give off water at a temperature less than that necessary to coagulate the albumen, submitting the closure to pressure, and then subjecting the cementing layer to a temperature sufficient to drive off the water from the crystalline substance and to set the albuminous material.

19. In the art of making closures comprising a shell and a sealing disk, the process which consists in interposing between the shell and the sealing disk a cementing layer comprising a carrier of paper charged with a filler and coated with a soluble albuminous material and a crystalline substance which will give off water at a temperature less than that necessary to coagulate the albumen, and then subjecting the cementing layer to a temperature sufficient to drive off the water from the crystalline substance and to set the albuminous material.

20. In the art of making closures comprising a shell and a sealing disk, the process which consists in interposing between the shell and the sealing disk a cementing layer comprising a carrier of paper charged with a filler and coated with a soluble albuminous material and a crystalline substance which will give off water at a temperature less than that necessary to coagulate the albumen, submitting the closure to pressure, and then subjecting the cementing layer to a temperature sufficient to drive off the water from the crystalline substance and to set the albuminous material.

In testimony whereof, I have hereunto set my hand, in the presence of two subscribing witnesses.

NORBERT M. LA PORTE.

Witnesses:
H. M. LAITHE,
E. E. LOVELL.